United States Patent [19]

Kawasaki et al.

[11] 4,249,364
[45] Feb. 10, 1981

[54] HEAT-SEAL TYPE WRAPPING APPARATUS

[75] Inventors: Kaoru Kawasaki; Masakazu Umehara, both of Osaka, Japan

[73] Assignee: Tenchi Kikai Kabushiki Kaisha, Fukai, Japan

[21] Appl. No.: 59,271

[22] Filed: Jul. 19, 1979

[30] Foreign Application Priority Data

Jul. 20, 1978 [JP] Japan .................................. 53-88875

[51] Int. Cl.$^3$ ............................................. B65B 9/08
[52] U.S. Cl. ..................................... 53/550; 53/229; 53/373
[58] Field of Search ................. 53/547, 550, 229, 373, 53/226, 284

[56] References Cited

U.S. PATENT DOCUMENTS

| | | | |
|---|---|---|---|
| 2,882,662 | 4/1959 | Campbell | 53/550 |
| 2,919,990 | 1/1960 | Podlesak et al. | 53/550 X |
| 3,210,905 | 10/1965 | Gerlach | 53/550 X |
| 3,667,971 | 6/1972 | Brunner | 53/547 X |
| 4,170,863 | 10/1979 | Schwanz | 53/229 X |

*Primary Examiner*—Horace M. Culver
*Attorney, Agent, or Firm*—Ward, Lalos, Leeds, Keegan & Lett

[57] ABSTRACT

A heat-seal type wrapping apparatus which operates by wrapping successive pieces of candy at regular intervals in a plastic film being unwound from a reel and being formed into a cylinder, subjecting the cylinder of plastic film to longitudinal heat seal along its overlapping margins and then to transverse heat seal between adjacent wrapped pieces of candy, and centrally severing the transversely heat-sealed regions. The apparatus comprises a device for preheating the overlapping margins of the film to a suitable temperature prior to the longitudinal heat seal and a device for preheating transverse heat-seal regions to a suitable temperature prior to the transverse heat seal, thereby ensuring satisfactory heat seal both longitudinal and transverse. The preheating device for transverse heat seal comprises a plurality of units arranged on a rotatable disc so that their radial positions can be adjusted, while the rotation of the transversely heat-sealing device is made adjustable to enable the spacing of transverse heat seal to be adjusted.

4 Claims, 20 Drawing Figures

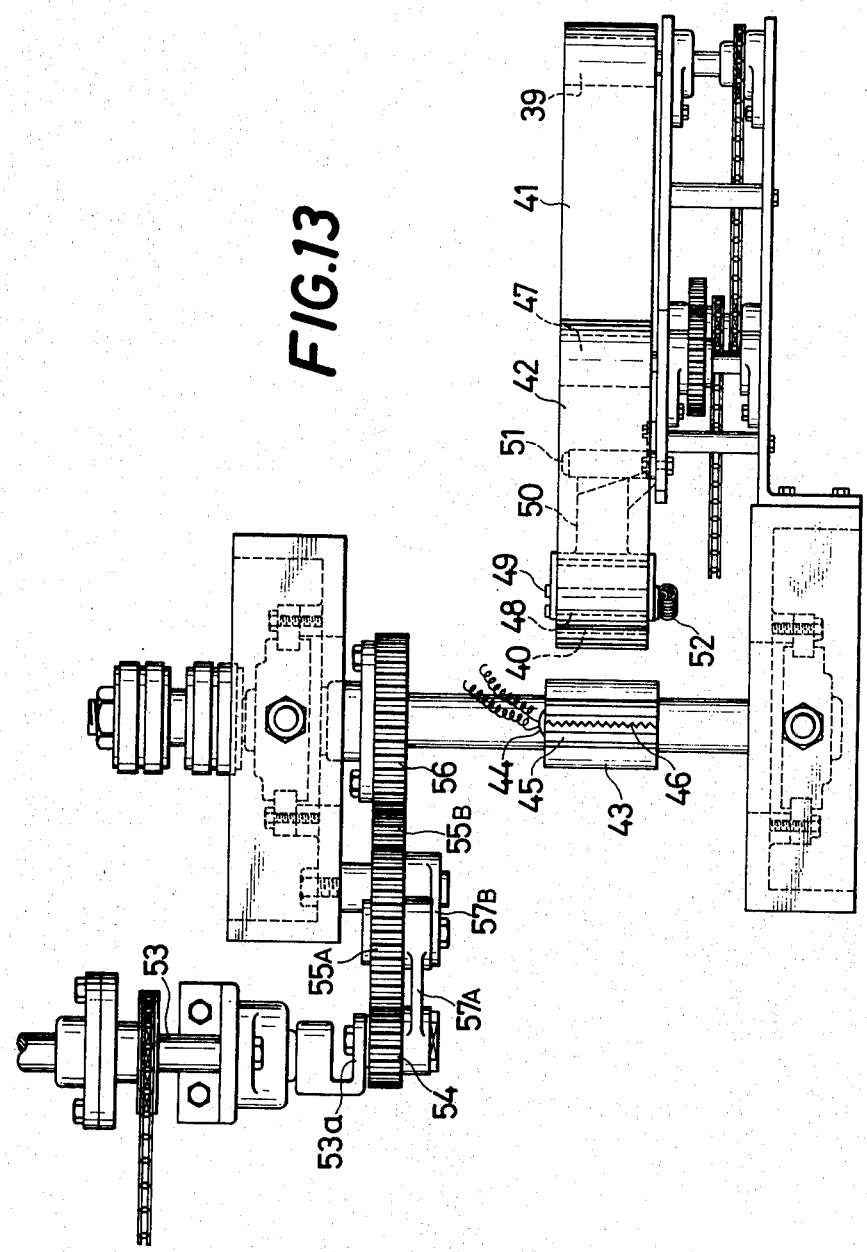

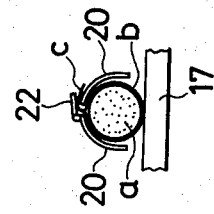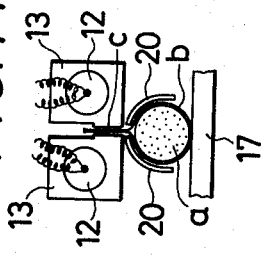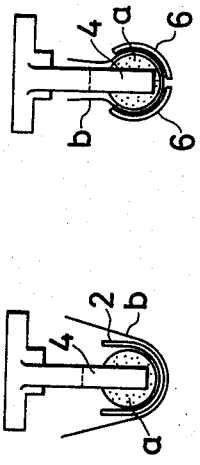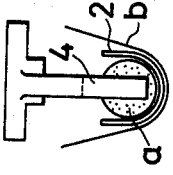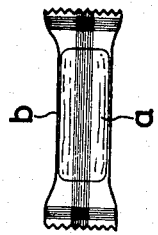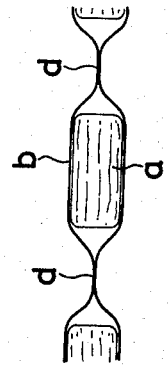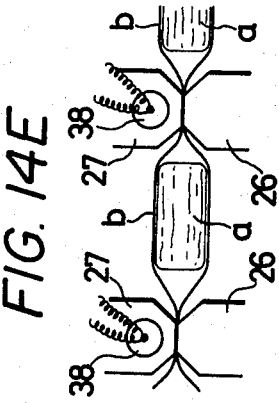

HEAT-SEAL TYPE WRAPPING APPARATUS

BACKGROUND OF THE INVENTION

The present invention relates to a heat-seal type wrapping apparatus and more particularly to a heat-seal type wrapping apparatus which operates by forming a long plastic film into a cylinder while unwinding it from a reel, wrapping successive articles, such as pieces of candy, at regular intervals in the plastic film which is being cylindrically formed, continuously heat-sealing the plastic film, and severing the cylinder of plastic film into separate heat-sealed packages.

As for a wrapping apparatus adapted to wrap articles in a film which is being formed into a cylinder and seal said film by a heat-sealing device, mention may be made, for example, of U.S. Pat. Nos. 2,260,046 and 2,886,930.

As for wrapping materials used in such heat-seal type wrapping apparatus, plastic films are generally used. Plastic films, though featuring low wrapping cost, have poor heat sealability such that quick heating often fails to provide a satisfactorily heat seal. For this reason, automatic wrapping apparatuses of this type have heretofore been operated at low speed for heat sealing, which is inefficient.

Further, ordinary automatic wrapping apparatuses have been designed on the assumption that the size of articles to be wrapped is constant or that the length of packages is constant. Therefore, when the size of articles to be wrapped or the length of packages is changed, it is necessary to change the speeds of conveyors for feeding a plastic film and articles to be wrapped and change the rotative speed of the transversely heat-sealing device, such changes involving troublesome adjustments.

SUMMARY OF THE INVENTION

An object of the invention is, in a heat-seal type wrapping apparatus of the character described above, to achieve a thorough heat sealing of a wrapping film (or plastic film) in high speed operation, thereby greatly increasing the wrapping efficiency.

Another object of the invention is to make it possible to adjust the spacing of transverse heat sealing and the spacing of severing at will and with ease according to the size of articles to be wrapped or the length of packages without having to lower the operating speed.

According to the invention, the apparatus comprises a device for preheating the overlapping margins of a moving cylinder of plastic film with pieces of candy wrapped therein, to a suitable temperature in heat-sealing said overlapping margins by a longitudinal heat-sealing device, and a device for preheating transverse heat seal regions between packaged pieces of candy to a suitable temperature in transversely heat sealing said regions by a tranverse heat sealing device upon completion of the longitudinal heat sealing.

According to the invention, since said plastic film is preheated to a suitable temperature agreeing with the characteristics of the film immediately before it is subjected to longitudinal and transverse heat sealing, respectively, through heat sealing, both longitudinal and transverse, is ensured. Thus, the high speed operation of the wrapping apparatus is allowed by properly maintaining said preheating temperature.

Further, in accordance with the size of articles to be wrapped or the length of packages, the timings for transverse heat sealing and severing can be adjusted, so that packages can be cut off individually with a required spacing of transverse heat sealing.

Other objects and features of the invention will become more apparent from the following description.

BRIEF DESCRIPTION OF THE DRAWINGS

FIG. 13 is a plan view of said transversely heat sealing device; and

FIGS. 14A through 14G show progressive steps in the wrapping and sealing process performed by the invention.

DESCRIPTION OF THE PREFERRED EMBODIMENT

Figure 1:
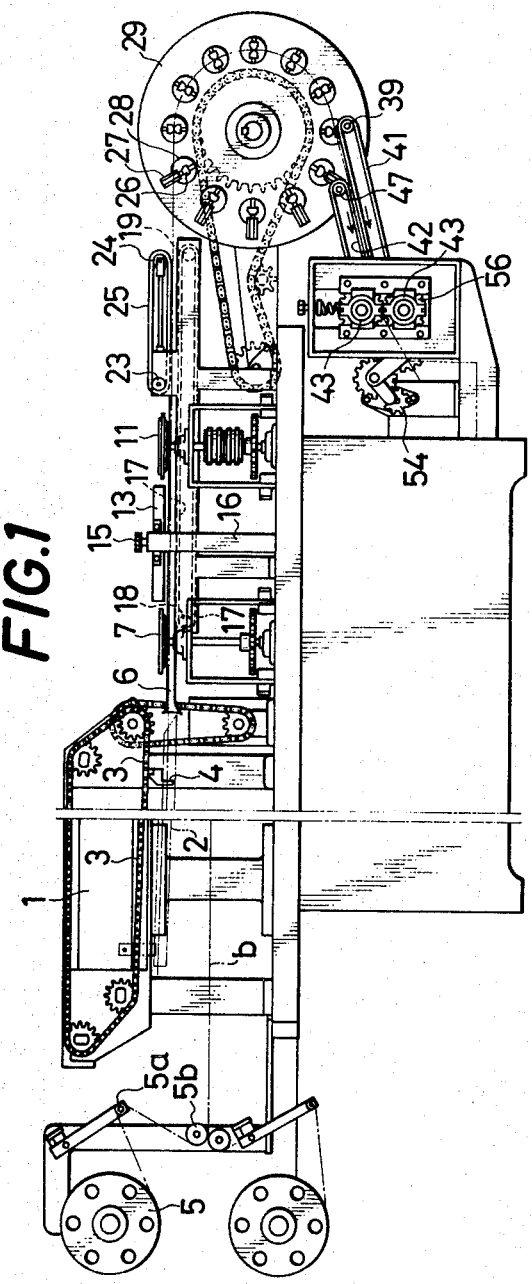
FIG. 1 is a front view of the principal portion of a heat-seal type wrapping apparatus according to the invention.
Figure 2:
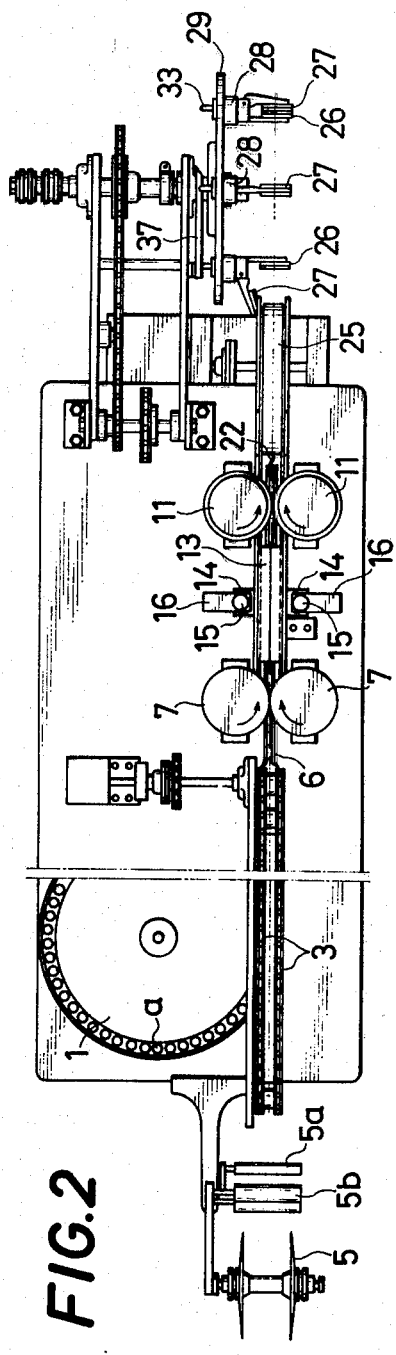
FIG. 2 is a plan view of the apparatus of FIG. 1.
Figure 3:
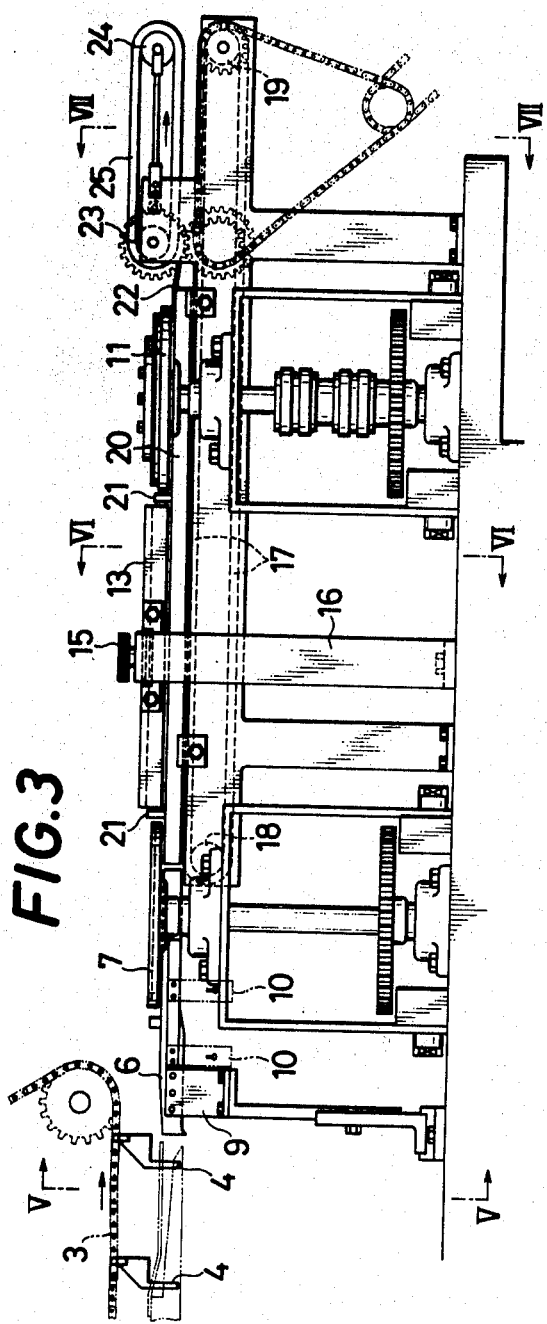
FIG. 3 is a front view showing a longitudinal heat sealing section and a preheating device associated therewith.
Figure 4:
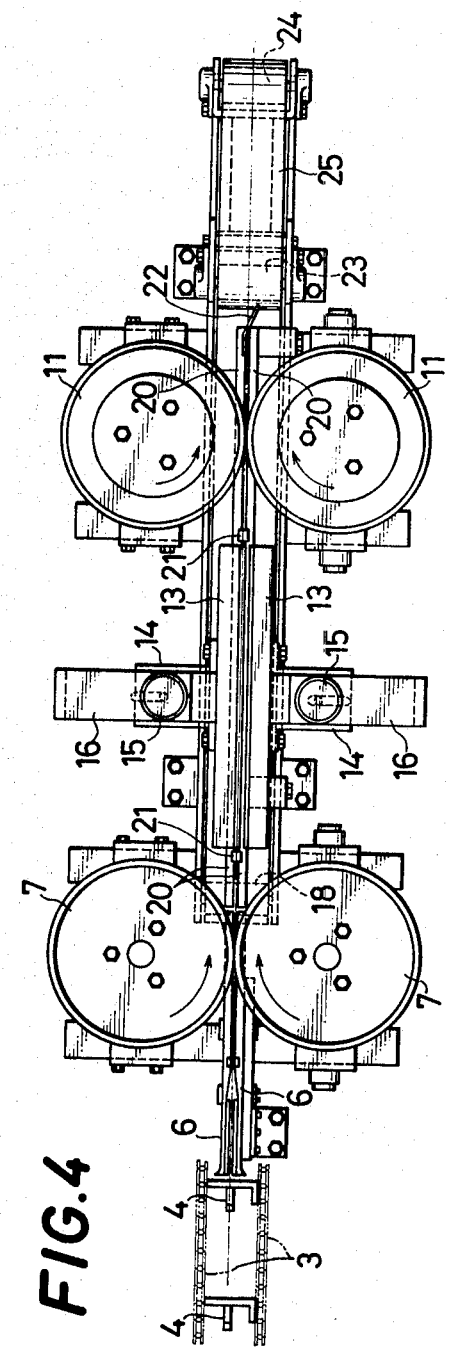
FIG. 4 is a plan view of FIG. 3.
Figure 5:
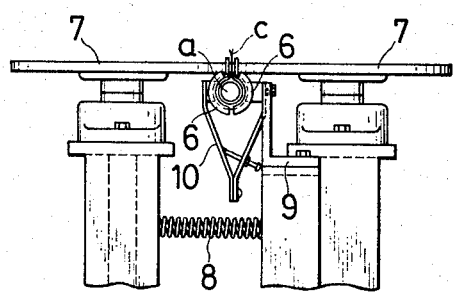
FIGS. 5, 6 and 7 are cross-sections taken along the lines V—V, VI—VI and VII—VII of FIG. 3, respectively.
Figure 6:
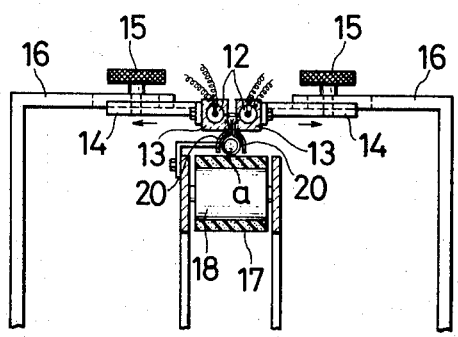
Figure 7:
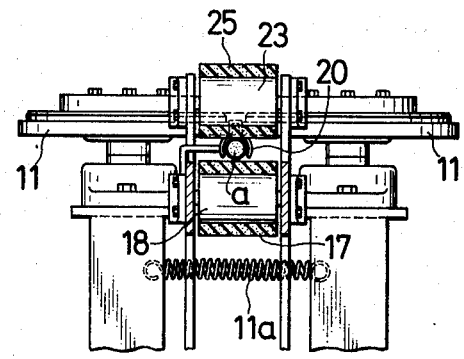
Figure 8:
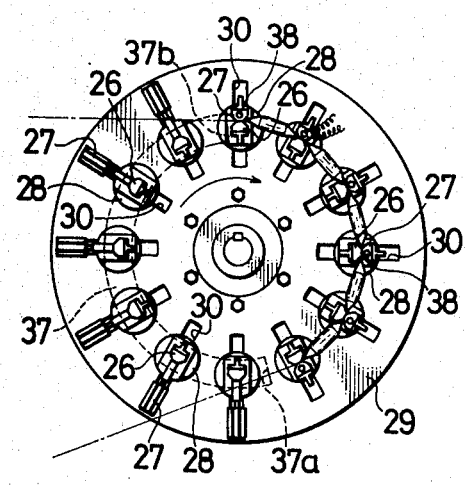
FIG. 8 is a front view of a preheating device for preheating transverse heat seal regions.
Figure 9:
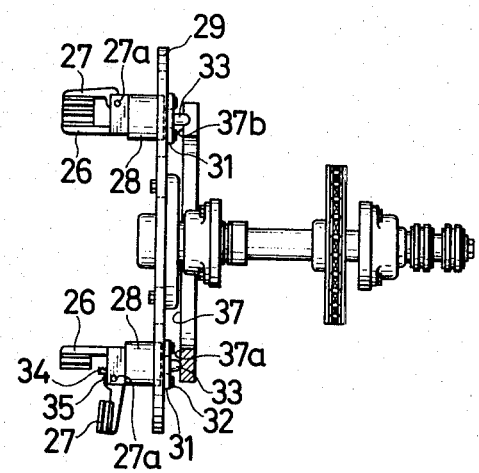
FIG. 9 is a side view of the principal portion of said preheating device.
Figure 10:
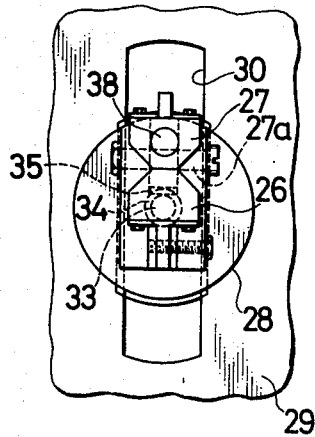
FIG. 10 is an enlarged front view of a portion of FIG. 8.
Figure 11:
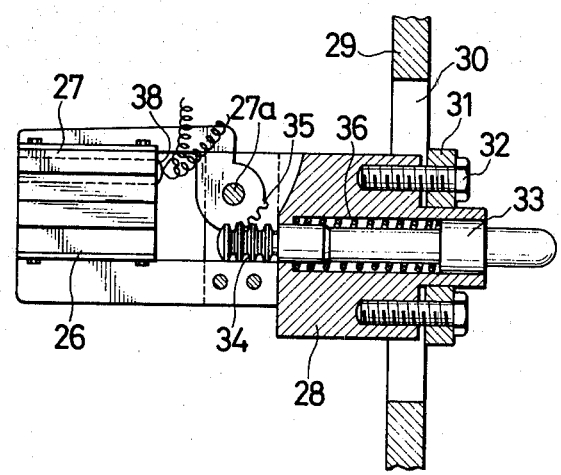
FIG. 11 is a side view of said portion.
Figure 12:
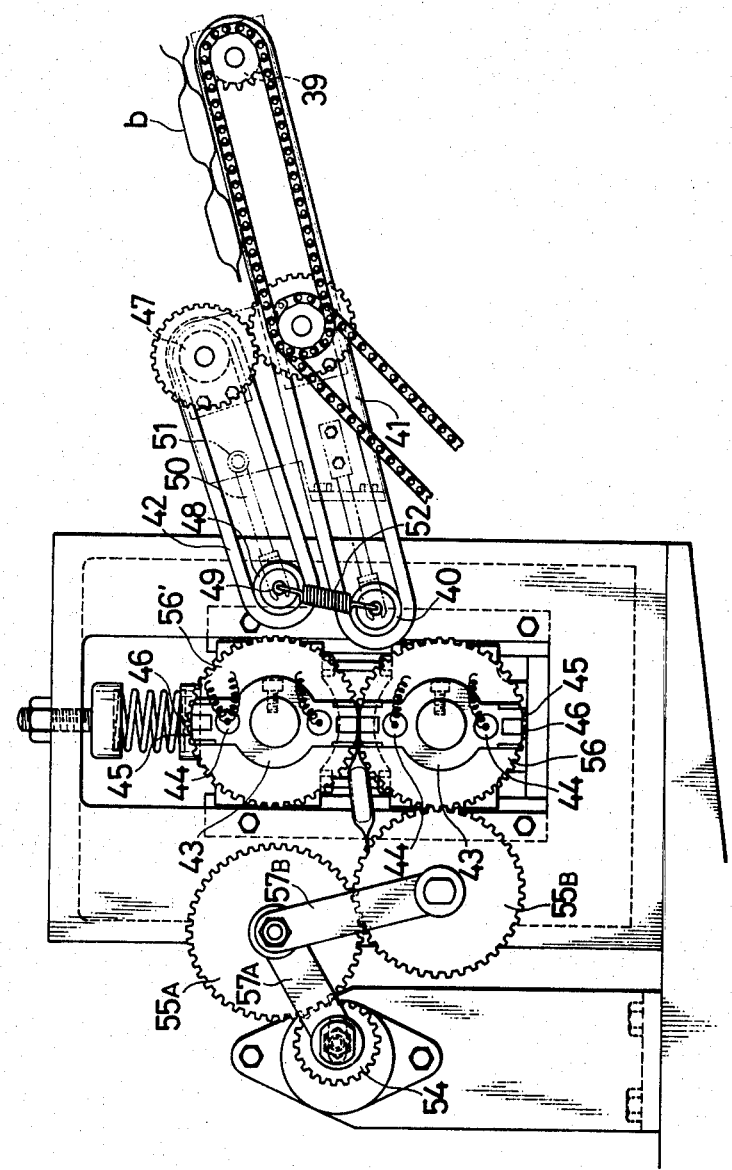
FIG. 12 is a front view of a transversely heat sealing device.

Pieces of candy a to be wrapped are arranged on the peripheral edge of a feed section 1 (see FIG. 2), and they are dropped one by one from said feed section 1 into a feed gutter 2 where they are forwardly transferred at regular intervals by a plurality of push feed rods 4 traveling along with an endless chain 3 to which they are attached. Plastic films b unwound from reels 5 and advancing under the feed gutter 2 in a condition shown in FIGS. 1 and 14(A) pass by the terminal end of the feed gutter 2 to enter formers 6 opposed to each other, as shown in FIGS. 1 and 14(B), and at the entrance thereto they are cylindrically bent, when they wrap the pieces of candy one by one which are being delivered from the terminal end of the feed gutter 2 by push feed rods 4, and the overlapping margins c of the cylindrically bent plastic films are nipped between a pair of opposed rotating delivery discs 7 disposed on opposite sides of their path, whereby the films are continuously drawn from the reels 5 via tension rollers 5a and 5b. The delivery discs 7, as shown in FIG. 5, are urged by a spring 8 in a direction to bring their rotating peripheral surfaces toward each other so as to nip the overlapping margins c of the plastic films b. One of the opposed formers 6 is fixed to an attaching member 9, while the other is supported by a plate spring 10 to grasp the pieces of candy a externally of the plastic films b to ensure that the spacing between the pieces of candy a wrapped at regular intervals will not be disturbed. The overlapping margins c of the plastic films b delivered from the delivery discs 7 will be guided or nipped between the pair of opposed rotating heat sealing discs 11 of a longitudinal heat sealing device containing electric heaters therein. On their way thereto, however, there are provided two preheaters 13 containing bar-like electric heaters 12 disposed to nip the overlapping margins c of the plastic films b therebetween for preheating the overlapping margins c to a suitable temperature agreeing with the characteristics of the plastic films b. The preheaters 13, as shown in FIGS. 6 and 14(C), are fixed to attaching portions 14 and are adjustably attached to an attaching frame 16 by screws 15 to maintain a spacing therebetween which is as narrow as possible but which does not interfere with the travel of the films. The pair of heat sealing discs 11 are urged by a spring 11a in a direction to bring them toward each other to nip said overlapping margins c therebetween. Installed below the path of the cylindrically bent plastic films b passing through the preheating section and the longitudinally heat sealing device is a sponge-surfaced conveyor belt 17 entrained around and extending between conveyor rollers 18 and 19, said conveyor belt traveling in the same direction as and at a little greater speed than the films b to prevent the films from stagnating. A semi-cylindrical guide gutter 20 which is split at its portion located in the path of the overlapping margins c to guide the cylindrical films having the pieces of candy a wrapped therein is installed immediately below the preheaters 13 to prevent the pieces of candy wrapped in the plastic films from being displaced relative to each other, the split parts of said guide gutter being connected together by connectors 21. The cylindrical films b being forwardly fed as heat-sealing along their overlapping margins c by the heat sealing discs 11 have their overlapping margins c horizontally bent as shown in FIG. 14(D) by a guide element 22 fixed to the terminal end of the guide gutter 20, whereupon the films together with the pieces of candy a are nipped between the conveyor belt 17 and a nip belt 25 entrained around and extending between rollers 23 and 24 to travel in face-to-face relation to said conveyor belt 17, whereby they are forwardly transferred.

Installed in the path of travel of the cylindrical films b delivered from between said belts 17 and 25 is a rotary disc 29 comprising a plurality of clamp members 28 circumferentially equispaced on its face and each having a pair of jaws 26 and 27 for successively clamping the portions of the films b between the wrapped pieces of candy a while the films are moving in a circular path. Each clamp member 28 is radially slidably fitted in an elongated opening 30 formed in the rotary disc 29 in order to adjust the spacing between adjacent clamp members 28, said clamp members being fixed to the rotary disc 29 by bolts 32 through clamp plates 31. Each clamp member has the jaw 26 fixed thereto at its front end and the jaw 27 tiltably journaled as at 27a and has an actuating rod 33 slidably extending through the center thereof and formed with a rack 34 at its front end which is meshing with a sector gear 35 carried at the base of the jaw 27. Springs 36 mounted on the respective actuating rods 33 urge the associated jaws in a direction to close the latter, while actuating rods 33 are adapted to be successively thrusted out to open the jaws 27 against the springs 36 by the initial end 37a of a face cam 37 extending in the direction of rotation of the rotary disc 29, said jaws 27 being successively closed when the actuating rods are retracted by the springs at the terminal end 37b of said cam. Each jaw 27 contains an electric heater 38 for preheating purposes.

Thus, the plastic films b delivered from between the belts 17 and 25 with the pieces of candy a wrapped therein at regular intervals travel while being clamped between the wrapped pieces of candy a by the jaws 26 and 27 at the terminal end 37b of the face cam 37 and are released from such clamping force at the initial end 37a. During this operation, the overlapping margins of the films b are preheated by the electric heaters 38 contained in the jaws 27 to a suitable temperature agreeing with the characteristics of the plastic films, as shown in FIG. 14(E). Since the clamp members 28 are slidable in the radially elongated openings 30 to adjust their clamp positions, as described above, by changing the dimension of the circumference along which they are arranged on the rotary disc 29 it is possible to change the spacing between adjacent clamp members so as to adjust the spacing between adjacent positions at which the plastic films are clamped by the jaws 26 and 27 to a suitable value agreeing with the size of packages.

The films b with the pieces of candy a wrapped therein are released from the jaws 26 and 27 by the face cam 37 as the rotary disc 29 is rotated, whereupon they are transferred to a spongy conveyor belt 41 entrained around and extending between rollers 39 and 40 and adapted to receive them at the clamp releasing section. The films are then nipped between said belt 41 and a spongy nip belt 42 traveling in the same direction as the belt 41 in face-to-face relation to the latter and are fed into the space between a pair of rotary blocks 43 arranged in a vertical line. The rotary blocks 43 constitute a known transversely heat sealing device adapted to heat-seal and sever the plastic films between adjacent wrapped pieces of candy and containing electric heaters 44. This device has heating nip surfaces 45 extending transversely of the cylinder of plastic films and cutting edges 46, so that the plastic films b having the pieces of candy a wrapped therein and fed in from between the belts 41 and 42 are transversely heat-sealed between the heating nip surfaces 45 at intermediate portions d shown in FIG. 14(F) located between adjacent wrapped pieces of candy and preheated between the jaws 26 and 27, and at the same time the transversely heat-sealed portions are cut by the cutting edges 46, thereby completing the heat sealed wrapping of individual pieces of candy, as shown in FIG. 14(G). The nip belt 42 is entrained around and extending between rollers 47 and 48, with the roller 48 urged by a spring 52 and arcuately movable by a support arm 50 for a shaft 49 around the axis of an attaching shaft 51. The transversely heat sealing device includes a radially adjustable crank gear wheel 54 attached to a crank portion on the end of a drive shaft 53 for the blocks 43, said crank gear wheel meshing with an intermediate gear wheel 55A and connected to the latter by a link 57A, said intermediate gear wheel meshing with a second intermediate gear wheel 55B which, in turn, meshes with the gear wheel 56 of one block 43, said intermediate gear wheels 55A and 55B being connected together by a link 57B. The blocks 43 are driven by the gear wheels 56 and 56' of the same diameter meshing with each other. The rotation of the drive shaft 53 is transmitted to the blocks 43 through said gear wheels 54, 55A, 55B and 56. As the intermediate gear wheel 55A is driven by the gear wheel 54, it drives the intermediate gear wheel 55B while swinging circumferentially on the gear wheel 55B under the control of the links 57A and 55B. Therefore, the peripheral speed of the blocks 43 driven by the gear wheel 56 meshing with the intermediate gear wheel 55B will change, the rate of such change being determined by the radial position of the gear whell 54 on the crank portion 53. Therefore, by adjusting the position of the gear wheel 54 on the crank portion 53a, it is possible to adjust the timings for heat sealing and for cutting by the cutting edges in accordance with the adjustment of the spacing of the clamp members 28, thereby ensuring that the size of the separate packages cut off agrees with the size of the wrapped articles.

The principles of the invention are described hereinabove by describing a preferred embodiment constructed accordingly. It is to be remembered that the described embodiment is only exemplary and modifications and changes therein will be readily perceived by those skilled in the art, but such modifications and changes will be within the spirit and scope of the invention as defined by the amended claims.

We claim:

1. A heat-seal type wrapping apparatus comprising:

a reel on which a long plastic film is wound so that it can be delivered;

a feed section at which pieces of candy are fed one by one onto a feed gutter;

a plurality of push feed rods for pushing the pieces of candy out of the feed gutter at regular intervals in the direction of delivery of the plastic film;

said push feed rods being driven by an endless chain;

a former for receiving the plastic film from the terminal end of the feed gutter to wind it into a cylinder, with the overlapping margins of the film directed upwardly;

said former being composed of two split members facing the path of travel of the plastic film and urged by a spring to wrap the pieces of candy fed by the push feed rods in the plastic film being cylindrically wound and to nip the wrapped pieces of candy exteranally of the plastic film;

a pair of delivery discs for delivering the plastic film by nipping said overlapping margins;

a longitudinally heat sealing device comprising a pair of heat sealing discs rotatable with electric heaters contained therein, said discs being urged to nip the overlapping margins of the plastic film therebetween to heat-seal the same;

a transversely heat sealing device comprising a pair of rotary blocks vertically arranged across the path of travel of the plastic film, each block having a heating nip surface containing an electric heater and a cutting edge at the center of said surface, the arrangement being such that said heating nip surfaces nip the cylindrical plastic film to heat-seal the latter and the cutting edges cut the transversely heat sealed portion at its middle;

a preheating device installed downstream of the longitudinally heat-sealing device, comprising a pair of preheaters disposed on both sides of the path of travel of the overlapping margins of the cylindrically formed plastic film, and electric heater for heating said preheaters to a suitable temperature, said preheaters being spaced a suitable distance from each other not to interfere with the travel of the overlapping margins to preheat the latter; and a preheating device installed downstream of the transversely heat-sealing device, comprising a plurality of clamp members circumferentially equispaced on a rotary disc, and a face cam, each clamp member having a jaw defining a circular path of the cylindrical plastic film and a second jaw adapted to open and close with respect to said first jaw under the control of said face cam as the rotary disc is rotated, said pair of jaws being adapted to nip the cylindrical plastic film therebetween at a place on said film between adjacent wrapped pieces of candy and transversely of the film, at least one of said jaws containing an electric heater for preheating the film to a suitable temperature.

2. A heat-seal type wrapping apparatus as set forth in claim 1, wherein said preheating device installed downstream of the longitudinally heat-sealing device is arranged so that the spacing between said preheaters is adjustable.

3. A heat-seal type wrapping device as set forth in claim 1, wherein said preheating device installed downstream of the transversely heat-sealing device is arranges so that the positions of the clamp members on the rotary disc are radially adjustable and wherein the rotation-drive mechanism for the transversely heat-sealing device is arranged so that the timing for nipping the plastic film by the heating nip surfaces of the pair of rotary blocks is adjustable in accordance with the adjustment of the radial positions of the clamp members.

4. A heat-seal type wrapping apparatus as set forth in claim 3, wherein the timing adjusting device for the transversely heat sealing device comprises a crank shaft driven by a prime mover, a gear wheel which is attached to the crank portion of the crank shaft so that its position can be radially adjusted, a first intermediate gear wheel meshining with said gear wheel, a second intermediate gear wheel meshing with said first intermediate gear wheel and adapted to transmit rotative power to a gear wheel integral with the rotary block, a link for connecting said gear wheel on the crank portion and said first intermediate gear wheel at their respective centers, and a link for connecting said first and second intermediate gear wheels at their respective centers, the arrangement being such that the radial position of said gear wheel on the crank portion cooperates with said links to control the swing motion of said first intermediate gear wheel on said second intermediate gear wheel.

* * * * *